UNITED STATES PATENT OFFICE.

BOTHO SCHWERIN, OF BERLIN, GERMANY, ASSIGNOR TO ELEKTRO-OSMOSE AKTIEN-GESELLSCHAFT (GRAF SCHWERIN GESELLSCHAFT), A CORPORATION OF BERLIN, GERMANY.

PROCESS FOR PURIFYING FLUIDS.

1,269,006.   Specification of Letters Patent.   Patented June 11, 1918.

No Drawing.   Application filed December 4, 1916.   Serial No. 135,055.

*To all whom it may concern:*

Be it known that I, BOTHO SCHWERIN, a subject of the German Emperor, residing at Berlin, Germany, Margarethenstr. 1, have invented certain new and useful Improvements in Processes for Purifying Fluids, of which the following is a specification.

A process for purifying, clarifying and decolorizing liquids and gases is known, which consists in adding to the liquids or gases artificially prepared silicic acid in a finely divided state freed from foreign adsorptions and then filtering.

In the description of this process various precipitating agents which had hitherto been utilized for purifying liquids are mentioned; in particular, artificially prepared silicic acid and the form in which it had already been utilized for purifying purposes. It was stated that the failure of the methods then known was due, among other causes, to the fact that the agent used had not the necessary pureness for obtaining the desired purpose, and the invention described consisted in the use of finely subdivided silicic acid freed from foreign adsorptions for the purpose of purification and the like.

As experiments of the inventor have shown, however, this process in certain cases does not lead to success, because there are many impurities which the pure silicic acid free from electrolytes does not adsorb.

Pure amorphous silicic acid is in itself slightly electro-negative, but can be altered as regards its charge capacity by adsorbing electrolytes and, as it shows an amphoteric character, the charge can even be reversed.

If, for example, I attempt, according to the method previously described, to purify water, the impurities of which are of a negative character, the previously known method will fail, since the pure silicic acid with its slightly negative charge is not in a position to adsorb and so remove from the water the similarly charged impurities. If, however, the silicic acid is positively charged by treating it with hydrochloric acid, it appears that an adsorption of the negative particles to the silicic acid takes place. The impurities so adsorbed may be readily removed by filtration, settling, or other suitable methods.

The possibility of altering the charge capacity of the silicic acid by adsorption processes makes it also possible to strengthen the negative charge of the pure amorphous silicic acid and with the silicic acid so prepared to purify liquids, the impurities of which are of a positive character and would, therefore, be adsorbed by the negative silicic acid, but in which however the normal potential difference between silicic acid and the positively charged particles is not sufficiently large to insure an adsorption. By strengthening the negative charge of the silicic acid, however, the required result can be obtained.

To vary the charge of the silicic acid in the positive direction acids are generally suitable, and toward the negative direction bases are suitable; these acids and bases may be referred to generically as unneutral substances. Charging the silicic acid by acids is especially advantageous for freeing drinking water from germs.

Having now particularly described and ascertained the nature of the said invention and the best means I know of carrying the same into practical effect, I claim:

1. A process of purifying liquids which comprises mixing with the liquid amorphous silicic acid the normal charge of which is so altered as to increase the potential difference between the silicic acid and the impurities which are to be adsorbed thereby.

2. A process for purifying liquids, in which to the liquid is added amorphous silicic acid, the charge of which is so altered by treatment with unneutral substances that the silicic acid has an increased power to adsorb the impurities of the liquid.

3. A process for removing germs from drinking water, in which amorphous silicic acid, of which the charge capacity is altered by treatment with acids, is added to the water.

In testimony whereof I affix my signature in presence of two witnesses.

BOTHO SCHWERIN.

Witnesses:
HENRY HASPER,
ALLEN F. JENNINGS.